United States Patent [19]

Csesznegi

[11] Patent Number: 4,731,666

[45] Date of Patent: Mar. 15, 1988

[54] KALEIDOSCOPE RECORDING APPARATUS

[75] Inventor: Charles F. Csesznegi, Hobbs, N. Mex.

[73] Assignee: Csesznegi's Art World Unlimited, Inc., Hobbs, N. Mex.

[21] Appl. No.: 733,043

[22] Filed: May 13, 1985

[51] Int. Cl.$^4$ ............................................. H04N 5/76
[52] U.S. Cl. .................................... 358/244; 350/4.1; 353/1; D21/60
[58] Field of Search ............... 358/250, 310, 335, 244; 360/55; 350/4.1; 353/1; D21/60; 346/110 R

[56] References Cited

U.S. PATENT DOCUMENTS

| | | | |
|---|---|---|---|
| 3,661,439 | 5/1972 | Burnside et al. | 353/1 |
| 4,475,126 | 10/1984 | Akins | 350/4.1 X |
| 4,586,085 | 4/1986 | Haendle | 358/244 |

OTHER PUBLICATIONS

Popular Photography, vol. 38, No. 3, pp. 45, 78-81, Mar. 1956.

Primary Examiner—Robert L. Richardson
Attorney, Agent, or Firm—Delmar L. Sroufe; Andres M. Arismendi, Jr.

[57] ABSTRACT

A kaleidoscope recording apparatus having a backlighted screen which emits a plurality of light rays in the form of moving imageable material into a kaleidoscope mirror set. The backlighted screen is positioned adjacent to the light-entry end of the mirror set. The mirrors convert the imageable material from the backlighted screen into a kaleidoscope pattern. A conventional video camera is positioned with its camera lens adjacent to the light-egress end of the mirror set to collect the egressing reflected and re-reflected light. The kaleidoscopic pattern is then converted by the video camera to a video signal which is recorded on video tape.

11 Claims, 7 Drawing Figures

KALEIDOSCOPE RECORDING APPARATUS

BACKGROUND OF THE INVENTION

This invention relates to a special effects recording apparatus and method, and more particularly, to a kaleidoscope recording apparatus and method.

In the optical and image recording fields, it has long been desired to produce and record reflected images of colorful objects which have interesting and varied patterns. This has been particularly true with respect to kaleidoscopic patterns. It has also long been desired to expand the kaleidoscopic image subject matter from colored glass particles in a rotatable drum to the world around us in its real or animated form. Typically, a viewing means such as a special lens assembly has been constructed to provide special effects of the objects observed through the lens assembly so that it may produce a colorful pattern of reflected images. However, such special effects lens assemblies have not been completely satisfying in that they have been costly to manufacture and assemble. Furthermore, there is the ever present problem of satisfactorily producing clear and sharp images of objects viewed over a wide range of distances and lighting conditions. It has also been desired to construct such an assembly which is capable of being used with various types of cameras, such as still, movie, video, or television cameras, in order to record the reflected images produced by such an assembly.

In general, the prior art relating to kaleidoscopic recording apparatus has elected an optics approach or solution with respect to expanding kaleidoscopic image subject matter. In following the optics approach, the prior art has placed heavy reliance on the use of at least one lens, an objective lens, spaced forwardly of and cooperating with a set of kaleidoscopic mirrors. A collecting or ocular lens is placed at the other end of the mirrors and projects the desired kaleidoscopic pattern onto a receiving medium, such as an eye, a camera, video recorder, etc. In use, the apparatus is held in a more or less horizontal position by the user with the ocular lens in close proximity to the eye and the objective lens directed toward objects lying within the field of direct view of the user of the apparatus, but not contained within the apparatus itself. Exemplary of such state of the art devices are depicted and described in the following U.S. Patents, namely: Burnside—U.S. Pat. No. Re 26,031; Taylor—U.S. Pat. No. 3,160,056; Burnside et al.—U.S. Pat. No. 3,661,439; and Powell—U.S. Pat. No. 3,930,711.

However, having elected an optics approach or solution, the prior art, therefore, had to address and formulate solutions to associated problems in optics. One such problem results from the phenomenon of parallax. Parallax in a kaleidoscope evinces itself as a failure of the lines of the kaleidoscopic pattern to join properly across boundaries of the sections of the pattern. The cause of parallax is the occurrence of a space between the plane formed by the light-entry ends of the mirrors and the location of the object being viewed kaleidoscopically. The prior art has sought to avoid or at least keep to a minimum such effects of parallax by a proper selection of the distance from the objective lens to the above-mentioned plane—that is, the focal length of the objective lens. Thus, the above-mentioned plane is made coincident with the focal plane of the objective lens. But since the image formed by the objective lens is not projected onto a screen but is seen directly, in the air, the limits or bounds of the image are set by the rim of the objective lens. Thus, the eye or other recording means, shall see as much of the image formed by the objective lens as is contained within a cone having the eye as apex and the rim of the lens as base. For proper positioning, the objective lens is necessarily at a relatively large distance from the plane of the light-entry ends of the mirrors, hence the parallax is excessive about the boundary of the kaleidoscopic pattern that is formed by it. Thus, the visible edge of the objective lens constitutes a grossly unsymmetrical boundary to the pattern. Burnside '031 remedied, or rather masked, such an effect by properly positioning an apertured disc at the point of least parallax so as to hide the rim of the objective lens from view and to substitute for the distractingly irregular boundary one which is smooth, regular and pleasing. Powell, who discloses a special effects lens which includes three identical longitudinal members with inner surfaces which act as light reflecting surfaces, in effect also hides from view the outer portion of his spherical objective lens so as to produce clear and sharp reflected images.

As alluded to above, another associated optics problem is the effective utilization of substantially the full capacity of the objective lens, rather than obscuring a portion of the objective lens from view. Taylor addresses this problem by adding specifically proportioned reflective elements or arms to the upper portion of the light-entry end of the kaleidoscope mirrors. The plane of the light-entry end of the mirrors is made coincident with the focal plane of the objective lens and the reflective elements extend therefrom to the objective lens. The purpose of the arms is to reflect substantially all of the more or less axially directed rays passing through the upper portions of the objective lens, so that the rim of the objective lens is also effectively utilized. Such an arrangement minimizes the inclusion of distortions or aberrated images resulting from reflections of the upper inside of the housing in the area between the objective lens and the focal plane thereof.

A third problem is kaleidoscopic in nature which is aggravated by the above-mentioned optics approach. The problem involves the production of a kaleidoscopic image array or pattern having substantially uniform image intensity throughout the various segments of the array. It is well-known that light diverging from a point source diminishes in intensity with increasing distance of travel. Thus, some light is lost with each reflection by the kaleidoscope mirror set because of the increasing divergence of the light rays. However, the optics approach aggravates the situation in that a portion of the light rays from the viewed object which are captured and focused by the objective lens to form an image in its focal plane do not reach the reflecting surfaces of the mirrors, but instead diverge away from the mirror. Thus, the amount of light available for reflection and re-reflection to form the kaleidoscopic array is further diminished. Therefore, upon close examination of the array, the unequal brightness of the various segments forming the array becomes apparent.

The prior art responded with optics solutions to increase the amount of light striking the mirrors so as to produce an image of substantially uniform image intensity throughout its various segments. Taylor in effect inclined the principal axis of the objective lens relative to the line of intersection of the mirrors so as to allow more of the light rays which would have previously diverged from the mirrors to now strike same. However, this results in defocusing of the array and, therefore, is unacceptable. Burnside '439, on the other hand, employs a converging lens positioned between the objective lens and objective lens focal plane. The converging lens serves to redirect the light rays which would have previously diverged from the mirrors back toward the mirrors, thereby increasing the amount of light available for reflection and re-reflection to form the array.

From the above, it is apparent that there exists a need for a kaleidoscopic recording apparatus which is capable of producing a sharply focused image array having substantially uniform image intensity throughout the various segments of the array. The present invention solves this need in a novel and unique manner which totally avoids the above-mentioned optics considerations, problems and associated solutions by utilizing a non-optics approach.

SUMMARY OF THE INVENTION

Accordingly, a feature of the present invention is to provide a kaleidoscope recording apparatus which is capable of producing a sharply focused image array having substantially uniform image intensity throughout the various segments of the array.

Another feature is to provide a kaleidoscope recording apparatus with backlighted screen means for emitting a plurality of light rays in the form of imageable material, which are reflected and re-reflected by a set of kaleidoscope mirrors.

A further feature is to provide a kaleidoscope recording apparatus with backlighted screen means positioned relative to the light-entry end of a set of kaleidoscope mirrors so as to obviate the need of a lens between the screen means and the mirrors, thereby avoiding the problems of such an optics approach.

Yet another feature is to provide a means for recording the reflected and re-reflected light rays egressing from the set of kaleidoscope mirrors.

Another feature is to provide a light collector means positioned adjacent to the light-egress end of the mirror set to focus and project the egressing reflected and re-reflected light rays to form a kaleidoscope pattern or array on the recording means.

A further feature is to provide a kaleidoscope mirror set which minimizes refraction problems and associated loss of light intensity.

Yet another feature is to provide means for selectively varying the interior angle of the kaleidoscope mirrors so as to vary the number of images in the kaleidoscope pattern.

Another feature is to provide means for monitoring the recording of a dynamic kaleidoscopic array or pattern.

An additional feature is to provide means for monitoring and editing the recording of a dynamic or realtime kaleidoscopic array or pattern from a video recording.

A further feature is to provide means for monitoring and recording a kaleidoscope array from an original image.

Yet another feature is to provide means for following the desired image as same changes position on the backlighted screen.

A specific feature of the present invention is to provide a kaleidoscope recording apparatus comprising a kaleidoscope mirror set comprising two planar mirrors in swingable contact along one edge forming an elongated open-end trough of predetermined interior angle, said kaleidoscope mirror set having a light-entry end and a light-egress end; backlighted screen means for emitting a plurality of light rays in the form of imageable material, said screen means facing the interior of the trough formed by said mirror set and adjacent to said light-entry end; means for recording said light rays egressing from said light-egress end; and light collector means adjacent to said light-egress end and through which said light rays are projected to form a kaleidoscopic pattern on said recording means.

The foregoing features and other features of the invention are realized in an illustrative embodiment of a kaleidoscope recording apparatus. The apparatus comprises a kaleidoscope mirror set, back-lighted screen means, recording means, and light collector means. The kaleidoscope mirror set comprises two planar mirrors in swingable contact along one edge forming an elongated open-end trough of predetermined interior angle. The trough has a light-entry end and a light-egress end. Preferably, the mirror set is also provided with means for selectively varying the interior angle of the mirror set so as to vary the number of images in the produced and recorded kaleidoscopic pattern. Furthermore, the individual mirrors are preferably surface coated so as to avoid problems with refraction and associated loss of light intensity.

The backlighted screen means emits a plurality of light rays in the form of imageable material. The screen means is positioned so as to face the interior of the trough formed by the kaleidoscope mirrors adjacent to the light-entry end. This obviates the need of a lens between the screen means and the light-entry end which was used for focusing light rays into the mirror set. Thus, without such a lens, the problems addressed by the prior art regarding such an optics approach are completely avoided. The backlighted screen means is preferably a high quality television monitor.

The recording means records the reflected and re-reflected light rays egressing from the light-egress end of the mirror set. Although movie cameras with or without sound recording means may be used, the recording means is preferably a video camera and a video recorder. The light collector means is preferably a lens on the video recording camera. The lens is positioned adjacent to the light-egress end of the mirror set so as to focus and project the egressing reflected and re-reflected light rays to form a kaleidoscopic pattern or array on a sensing screen within the video recording camera which cooperates with the video recorder to record onto video recording tape the kaleidoscopic pattern so produced. Preferably, the optical axis of the lens is substantially parallel to the line of intersection of the two mirrors and positioned so as to minimize the distance between same such that no portion of the lens is obscured by the mirrors. The lens is also preferably in a coplanar relationship with the light-egressing end of the mirrors.

The presently preferred use of a high quality television set for the backlighted screen is particularly adapted for the production of dynamic kaleidoscope arrays from televised subject matter, or from playback of video recordings. Movement of images of people, animals, vehicles and the like on the television screen produces very attractive and interesting dynamic kaleidoscopic patterns.

The apparatus further comprises means for selectively varying the interior angle of the kaleidoscope mirror set so as to vary the number of images or segments in the kaleidoscopic pattern. Such angle varying means are well-known in the art. Furthermore, an indication of the number of images produced by a particular interior angle may also be provided. This too is well-known in the art.

However, it is preferable to provide means for monitoring the kaleidoscopic recording in a real-time or dynamic sense so as to ensure the production of a sharp and proper kaleidoscopic image. Preferably, this is accomplished via a high quality television monitor in cooperation with the recording video recorder. Such real-time monitoring allows realtime interior angle and camera adjustments to produce a quality recording. This also allows the freedom to kaleidoscopically vary the produced image during a kaleidoscopic production so as to provide the desired special effects sequences.

For editing purposes, it is also preferable to provide means for recording the unaltered subject matter of a kaleidoscopic production. If the original real-time recording does not produce the desired special effects sequence, the unaltered subject matter may be further kaleidoscopically manipulated under varying conditions and re-recorded in another real-time sequence until the desired special effects are achieved.

Additionally, the apparatus may comprise means for adjustably positioning the kaleidoscope mirror set and video camera horizontally and/or vertically relative to the backlighted screen means. Such positioning means allows the proper framing of the central figure of the unaltered subject matter within a segment or image of the recorded kaleidoscopic pattern, if so desired. The positioning means may comprise a planar body for mounting the mirror set and video camera and a base member. The planar body may be horizontally positioned via a plurality of wheels mounted on the base member. The planar body may also be vertically positioned via a scissor jack means interposed between the planar body and the base member.

Accordingly, these and other features and advantages of the present invention will become apparent from the following detailed description, wherein reference is made to the figures in the accompanying drawings.

IN THE DRAWINGS

DETAILED DESCRIPTION

Figure 1:
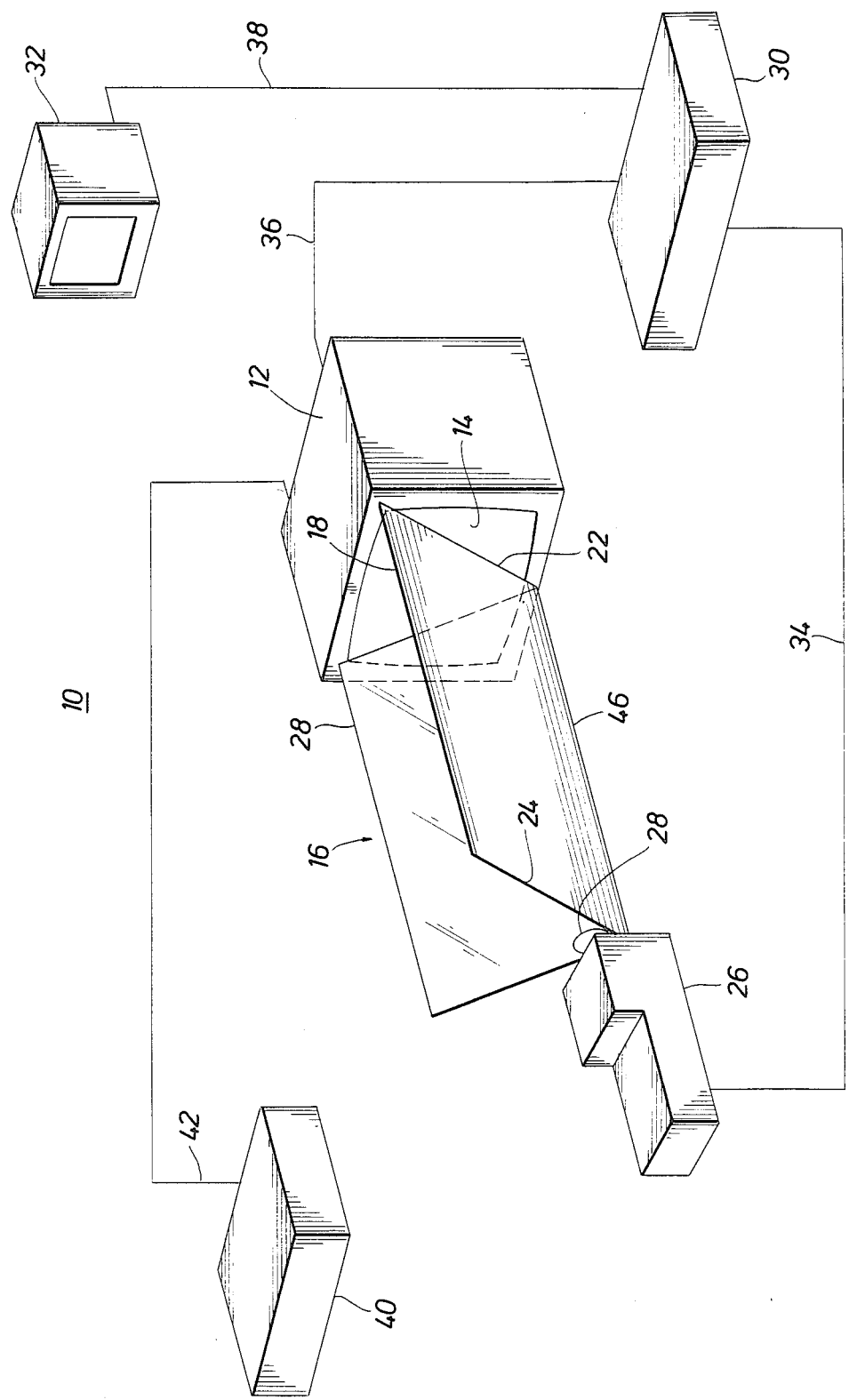
FIG. 1 is a perspective view partly diagrammatic of a kaleidoscope recording apparatus embodying the concepts of the present invention.

Referring now to the drawings in which like numerals denote similar elements, and more particularly to FIG. 1, there is shown by way of illustration, but not of limitation, a kaleidoscope recording apparatus denoted generally as 10. The apparatus 10 comprises a first high quality television monitor 12 having a backlighted screen 14, a kaleidoscope mirror set 16, and a video recording system. The kaleidoscope mirror set 16 comprises two planar mirrors 18 and 20 in hinged contact along one edge. Thus, the kaleidoscope mirror set 16 forms an elongated open-end trough of a predetermined interior angle and having a light-entry end 22 and a light-egress end 24. Preferably, the planar mirrors 18 and 20 are surface coated mirrors so as to avoid problems relating to refraction and associated loss of light intensity.

The backlighted screen 14 emits a plurality of light rays in the form of imageable material. The source of the imageable material may be a video camera, a television transmission, a video tape, and the like. The backlighted screen 14 is positioned facing the interior of the trough formed by the kaleidoscope mirror set 16 and also adjacent to the light-entry end 22. Thus, the emitted light rays are focused into the kaleidoscope mirror set 16 without the need of a lens between the backlighted screen 14 and the kaleidoscope mirror set 16. Thus, a substantial portion of the emitted light is available for reflection and re-reflection to form a kaleidoscopic pattern of substantially uniform image intensity throughout its various segments. Furthermore, such an arrangement also minimizes or eliminates problems with parallax since there is practically no space between the plane formed by the light-entry end 22 and the location of the object being viewed kaleidoscopically, i.e., the backlighted screen 14.

The video recording system comprises a video recording camera 26 having a lens 28 and a first video recorder 30 into which is inserted or loaded video recording tape. The video recording system records the reflected and re-reflected light rays egressing from the light-egress end 24. The lens 28 is positioned adjacent to the light-egress end 24 so as to focus and project the egressing reflected and re-reflected light rays to form a kaleidopscopic pattern on a sensing screen within the video recording camera 26. The video recording camera 26 in turn transmits a video signal of the kaleidoscopic pattern via a video cable 34 to the first video recorder 30. The first video recorder 30 then records the video signal on video tape. The corresponding sound track of the subject matter being recorded is transmitted via cable 36 from the first television monitor 12 to the first video recorder 30 so as to also record this sound track on the video tape.

Preferably, the video system also comprises means for monitoring the kaleidoscopic recording in a real-time sense. The monitoring of the kaleidoscopic recording is preferably accomplished via a second high quality television monitor 32 which receives the video signal of the kaleidoscopic pattern from the first video recorder 30 via cable 38. Such real-time monitoring allows interior angle and video recording camera 26 adjustments to produce a quality recording. This also allows the freedom to kaleidoscopically vary the produced image during a kaleidoscopic production so as to provide the desired special effects sequences.

For editing purposes, it is also preferable that the video system be provided with means for preserving and playing back the unaltered imageable material or subject matter of a kaleidoscopic production. Preferably, such means is a second video recorder 40 which receives a video and sound signal from the first television monitor 12 via cable 42 and records same on a video recording tape. Thus, if the original real-time recording does not produce the desired special effects sequence, the unaltered subject matter may be played-back and further kaleidoscopically manipulated under varying interior angle and video recording camera 26 settings and rerecorded in another real-time sequence until the desired special effects are achieved.

Alternatively, the second video recorder 40 may be used to play-back pre-recorded video taped subject matter which is transmitted to the first television monitor 12 via cable 42. The pre-recorded subject matter may then be kaleidoscopically manipulated and recorded in a real-time sequence to achieve the desired special effects. Such pre-recorded subject matter may be conveniently recorded as a dynamic moving kaleidoscopic array; it may be edited and recorded again in part or in its entirety with any desired changes in the mirror angles, light intensity or the like.

Figure 3:
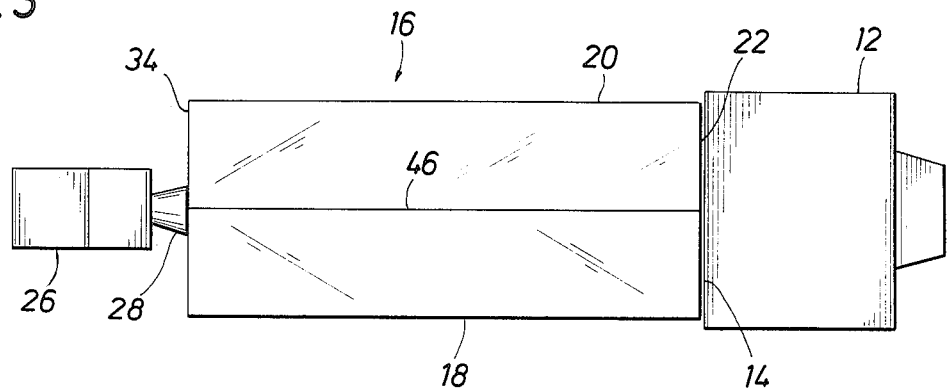
FIG. 3 is a side plan view of the embodiment illustrated in FIG. 2.
Figure 2:
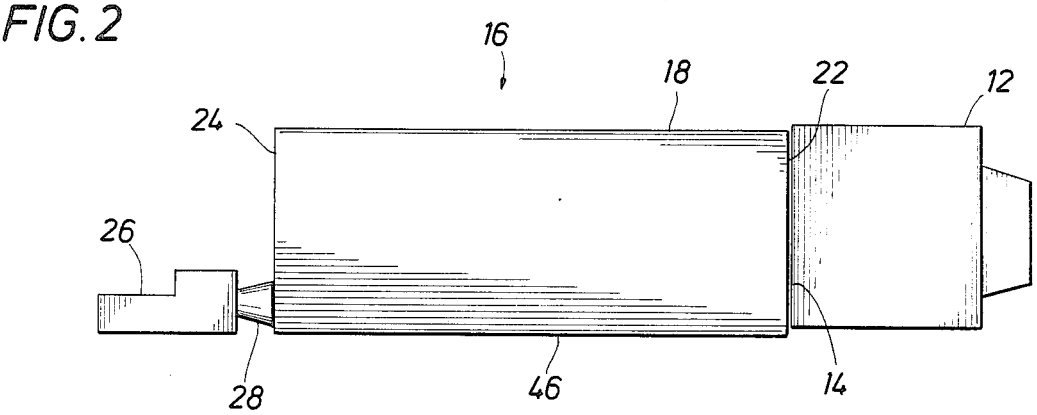
FIG. 2 is a partial top plan view of the embodiment illustrated in FIG. 1.

Referring now to FIGS. 2 and 3, there is shown a side and top plan view, respectively, of a preferred orientation of the first television monitor 12, the kaleidoscope mirror set 16, and the video recording camera 26. The first television monitor 12 is positioned such that the backlighted screen 14 is facing the interior of the trough formed by the kaleidoscope mirror set 16 and also adjacent to the light-entry end 22. Each of the mirrors 18 and 20 preferably has a width dimension greater than the diagonal dimension of the backlighted screen 14. This is to ensure that a substantial portion of the light emitted by the backlighted screen 14 is available for reflection and re-reflection to form a kaleidoscopic pattern of substantially uniform image intensity throughout its various segments.

The video recording camera 26 is positioned such that the camera lens 28 has an optical axis substantially parallel to the line of intersection or apex 46 of the mirrors 18 and 20. The camera lens 28 is also positioned so as to mimimize the distance between the optical axis of the camera lens 28 and the apex 46 without obscuring any portion of the camera lens 28 with the mirror set 16. This results in the observation of a satisfactorily symmetrical kaleidoscopic pattern. Furthermore, the camera lens 28 is positioned in a substantially coplanar relationship with the light-egressing end 24 so as to avoid the loss of a portion of the kaleidoscopic pattern by vignetting.

Figure 4:
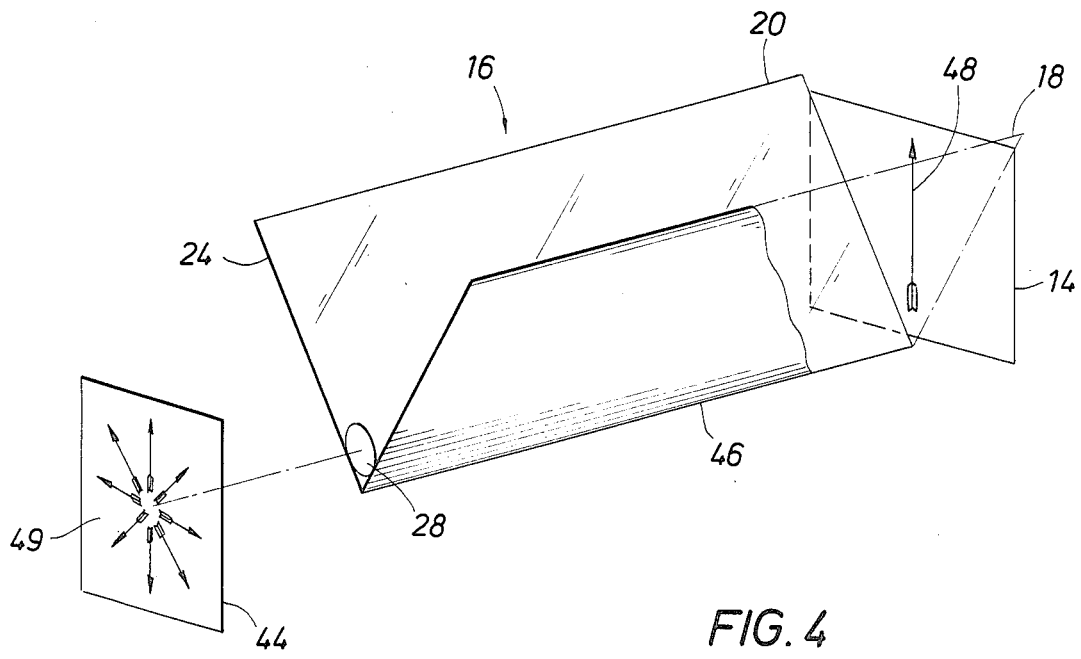
FIG. 4 is an optical diagram, in perspective, illustrating the principles of the kaleidoscope of the present invention.

Referring now to FIG. 4, there is shown an optical diagram illustrating the principles of the kaleidoscope of the present invention. The backlighted screen 14 emits a plurality of light rays in the form of imageable material 48. The backlighted screen 14 is positioned facing the interior of the trough formed by the kaleidoscope mirror set 16 and also adjacent to the light-entry end 22. These emitted light rays are then reflected and re-reflected by the kaleidoscope mirror set 16. The kaleidoscope pattern 49 so produced can then be displayed on a generally planar surface, herein preferably a sensing screen 44 within the video camera 26, by placing the camera lens 28 at the light-egress end 24 as previously indicated. The sensing screen 44 then cooperates with the remaining portions of the video recording system to record the kaleidoscopic production.

Preferably, the central figure of the imageable material 48 is centrally framed within a segment or image of the kaleidoscopic pattern 49 to produce a sharp and regular pattern and special effects sequence. The center of the kaleidoscopic pattern 49 is preferably occupied by a regular dark form called a black-hole. The black-hole is created by positioning the apex 46 of the mirror set 16 below the lower edge of the backlighted screen 14. The black-hole tends to shift attention to the multiple images of the kaleidoscopic pattern 49 rather than the center of same. Thus, kaleidoscopic special effect is more readily apparent and appreciated.

Figure 5:
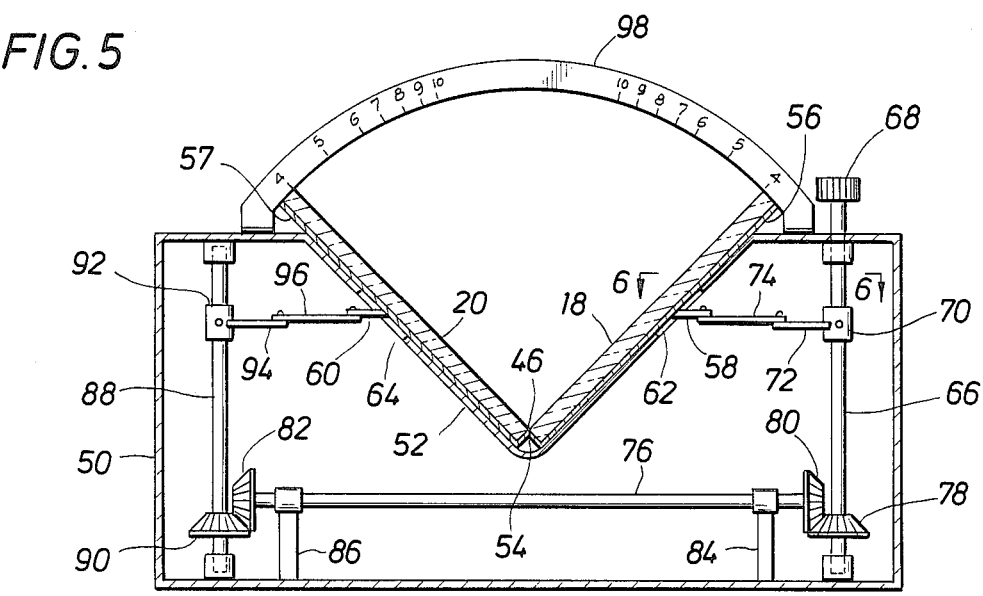
FIG. 5 is a cross-sectional view of an embodiment of the kaleidoscope mirror set interior angle varying means.

Referring now to FIG. 5, there is shown a kaleidoscope mirror apparatus 50 for varying the interior angle of the kaleidoscope mirror set 16 and indicating the number of segments in the kaleidoscopic pattern 49. The backs of mirrors 18 and 20 are adhesively or mechanically affixed to plates 56 and 57, respectively. The mirrors 18 and 20 then rest within a trough-like structure 52 on shoulder 54 such that the mirrors 18 and 20 intersect and are in swingable contact with each other along one edge which forms the apex 46 of the kaleidoscope mirror set 16. Ears 58 and 60 are secured to the backside of plates 56 and 57, respectively, and project through corresponding openings 62 and 64 in the trough-like structure 52.

On opposite sides of the trough-like structure 52 and within the mirror apparatus 50, there are supported vertically disposed shafts 66 and 88. The first shaft 66 carries a knob 68 at its upper outer end and a collar 70 at the intermediate portion from which extends a lever 72. The outer end of lever 72 is connected to the ear 58 by a pivotal link 74. Likewise, the second shaft 88 carries a collar 92 at its intermediate portion from which extends a lever 94. The outer end of lever 94 is connected to the ear 60 by a pivotal link 96.

A third shaft 76 is horizontally disposed within the mirror apparatus 50. The third shaft 76 is supported by supports 84 and 86 and axially rotatable. Pinion gears 80 and 82 on the ends of the third shaft 76 engage pinion gears 78 and 90 on shafts 66 and 88, respectively. Thus, by rotating the knob 68, the interior angle of the kaleidoscope mirror set 16 may be adjusted to the desired angular relation between the mirrors 18 and 20.

An arch member 98 is provided to indicate the number of segments in the kaleidoscopic pattern 49 corresponding to the interior angle of the kaleidoscope mirror set 16. By increasing or decreasing the angle between the mirrors 18 and 20, the number of segments or images in the kaleidoscopic pattern 49 will decrease or increase accordingly. The number of images forming the kaleidoscopic pattern 49 is mathematically determinable by dividing the angle between the mirrors 18 and 20 into 360°. Thus, the arch member 98 is calibrated to indicate the number of segments in the kaleidoscopic pattern 49 corresponding to a given interior angle of the kaleidoscope mirror set 16.

Furthermore, the kaleidoscope mirror set 16 is preferably not enclosed within the kaleidoscope mirror apparatus 50. This allows direct visual monitoring of the kaleidoscopic patterns 49 produced and avoids any unnecessary side effects caused by such a covering.

Figure 6:
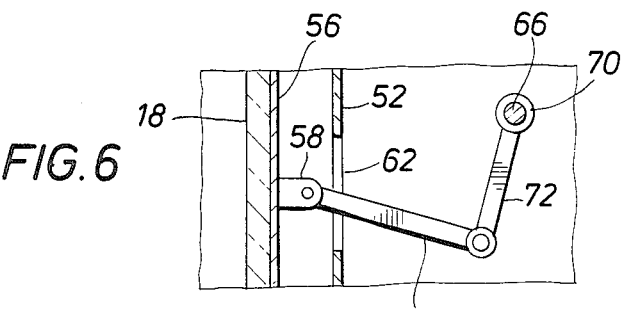
FIG. 6 is an enlarged cross-sectional view taken essentially on line 6—6 of FIG. 5.

Referring now to FIG. 6, there is shown an enlarged sectional view of a portion of the interior angle varying means utilized in the kaleidoscope mirror apparatus 50. The back of mirror 18 is adhesively or mechanically affixed to the plate 56. The mirror 18 then rests within the trough-like structure 52. The ear 58 is secured to the backside of the plate 56 and projects through a corresponding opening 62 in the troughlike structure 52. The lever 72 extends from the collar 70 on the first shaft 66. The outer end of lever 72 is connected to the ear 58 by the pivotal line 74. Thus, as the first shaft 66 is rotated, the mirror 18 is displaced relative to the trough-like structure 52, thereby varying the interior angle of the kaleidoscope mirror set 16.

Figure 7:
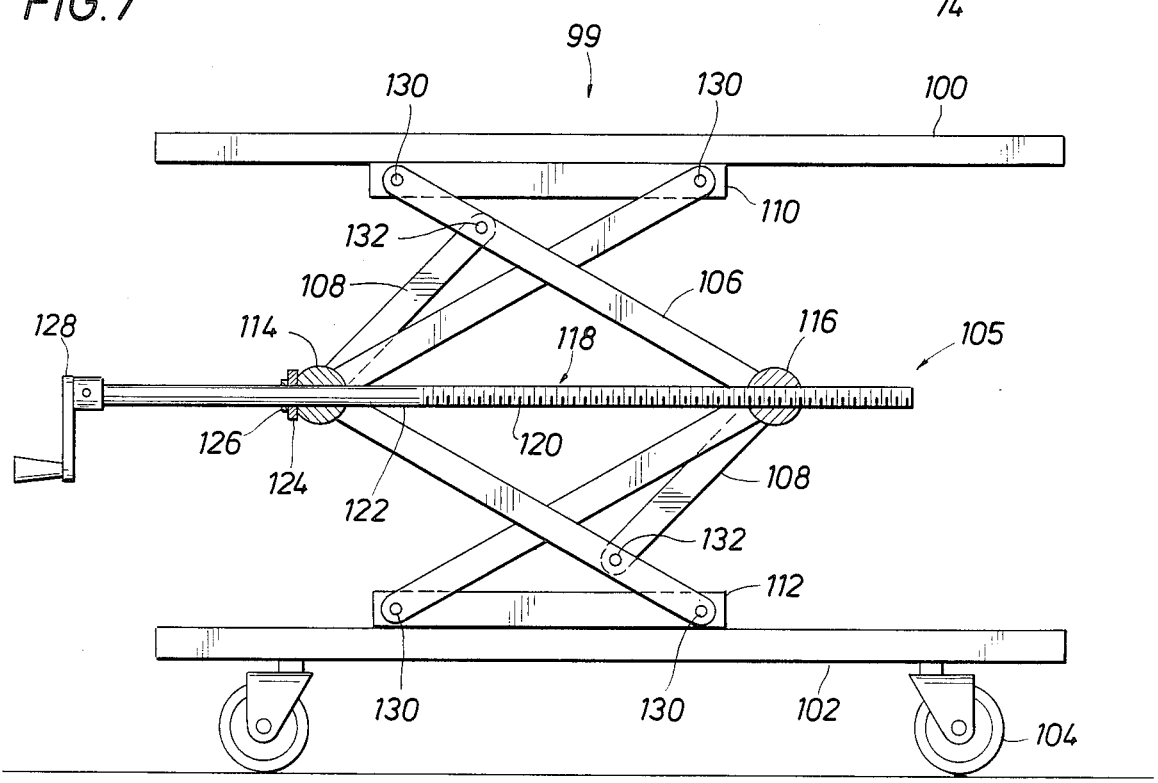
FIG. 7 is a cross-sectional view of an embodiment of the horizontal and vertical positioning means.

Referring now to FIG. 7, there is shown a work table 99 which supports the kaleidoscope mirror apparatus 50 and the video recording camera 26 and which adjustably positions same horizontally and/or vertically relative to the backlighted screen 14. The work table 99 comprises a planar body 100 and a base member 102. The kaleidoscope mirror apparatus 50 and the video recording camera 26 are mounted on the planar body 100. The work table 99 may be horizontally positioned via a plurality of wheels 104 mounted on the base member 102. The planar body 100 may be vertically positioned via a scissor jack 105 interposed between the planar body 100 and base member 102 and connected to same using the pins 130 and brackets 110 and 112, respectively.

The scissor jack 105 comprises a plurality of pivotal links 106, a first pivot member 114, a second pivot member 116, and a rod 118. The first pivot member 114 has a cylindrical hole therethrough which is perpendicular and centrally located relative to the long axis of the first pivot member 114. The second pivot member 116 has an internally threaded cylindrical hole therethrough which is perpendicular and centrally located relative to the long axis of the second pivot member 116. The rod 118 has a threaded end portion 120 and a non-threaded end portion 122.

The long axis of the first pivot member 114 and the second pivot member 116, respectively, are maintained substantially equidistant from and parallel to the planar body 100 and the hose member 102 by the pivotal links links 106 which interconnect same. The cylindrical holes through the first and second pivot members 114 and 116, respectively, are maintained in a substantially coaxial relationship by the rod 118 extending therethrough. The rod 118 is oriented such that the threaded end portion 120 engages the threaded hole of the second pivot member 116 while the non-threaded end portion 122 extends through the hole of the first pivot member 114. A washer 124 and a stop 126 prevent the non-threaded end portion 122 from slipping through the hole in the first pivot member 114. Thus, the only means of extracting the rod 118 is by disengaging the threaded end portion 120 from its corresponding threaded hole. A crank 128 is secured to the end of the non-threaded end portion 122 to rotate the rod 118, thereby raising or lowering the planar body 100 as the threaded end portion 120 is screwed into or out of the threaded hole in the second pivot member 116, respectively. Preferably, bracking links 108 are provided which are pivotally connected on one end to either the first pivot member 114 or the second pivot member 116 and pivotally connected on the other end to a selected pivotal link 106 by way of a connector 132.

It will be apparent from the foregoing that many other variations and modifications may be made in the apparatus and methods hereinbefore described, by those having experience in this technology, without departing from the concept of the present invention. Accordingly, it should be clearly understood that the apparatus and methods depicted in the accompanying drawings and referred to in the foregoing description are illustrative only and are not intended as limitations on the scope of the invention.

What is claimed is:

1. A kaleidoscope recording apparatus comprising:
   a kaleidoscope mirror set comprising two planar mirrors in swingable contact along one edge forming an elongated open-end trough of predetermined interior angle, said kaleidoscope mirror set having a light-entry end and a light-egress end;
   backlighted screen means for emitting a plurality of light rays in the form of imageable material, said screen means facing the interior of the trough formed by said mirror set and adjacent to said light-entry end;
   means for recording said light rays egressing from said light-egress end; and
   light collector means adjacent to said light-egress end and through which said light rays are projected to form a kaleidoscopic pattern on said recording means.

2. A kaleidoscope recording apparatus as described in claim 1, further comprising:
   means for selectively varying said interior angle so as to vary the number of segments in said kaleidoscopic pattern; and
   means for indicating the number of segments in said kaleidoscopic pattern when said interior angle is varied.

3. A kaleidoscope recording apparatus as described in claim 2, further comprising:
   means for monitoring said recording of the kaleidoscopic pattern.

4. A kaleidoscope recording apparatus as described in claim 3, further comprising:
   means for preserving and playing back said imageable material in its unaltered form for editing purposes.

5. A kaleidoscope recording apparatus as described in claim 4, further comprising:
   means for adjustably positioning said kaleidoscope mirror set relative to said backlighted screen means so as to allow proper framing of said subject matter within a segment of said kaleidoscopic pattern.

6. A kaleidoscope recording apparatus as described in claim 5, wherein said backlighted screen means is a first television monitor.

7. A kaleidoscope recording apparatus as described in claim 6, wherein said recording means comprises:
   a first video recording tape;
   a first video recorder into which said first video recording tape is inserted; and
   a video recording camera which senses said light rays egressing from said light-egress end and in cooperation with said first video recorder record a video signal of said kaleidoscopic pattern onto said first video recording tape.

8. A kaleidoscope recording apparatus as described in claim 7, wherein said preserving and playing back means comprises:
   a second video recording tape; and
   a second video recorder into which said second video recording tape is inserted, said second video recorder recording a video signal of said imageable material in its unaltered form, said video signal originating from said first television monitor.

9. A kaleidoscope recording apparatus is described in claim 8, wherein said monitoring means is a second television monitor.

10. A kaleidoscope recording apparatus as described in claim 9, wherein said light collector means is a lens on said video recording camera, said lens having an optical axis substantially parallel to the line of intersection of said mirrors and positioned so as to minimize the distance between same such that no portion of said lens is obscured by said mirrors, said lens being in a substantially coplanar relationship with said light-egressing end.

11. A kaleidoscope recording apparatus as described in claim 1, wherein said planar mirrors are surface coated mirrors so as to avoid problems relating to refraction and associated loss of light intensity.

* * * * *